(No Model.)
W. B. MUMFORD.
HOOK AND BAIT SAFETY BOX.
No. 402,270. Patented Apr. 30, 1889.
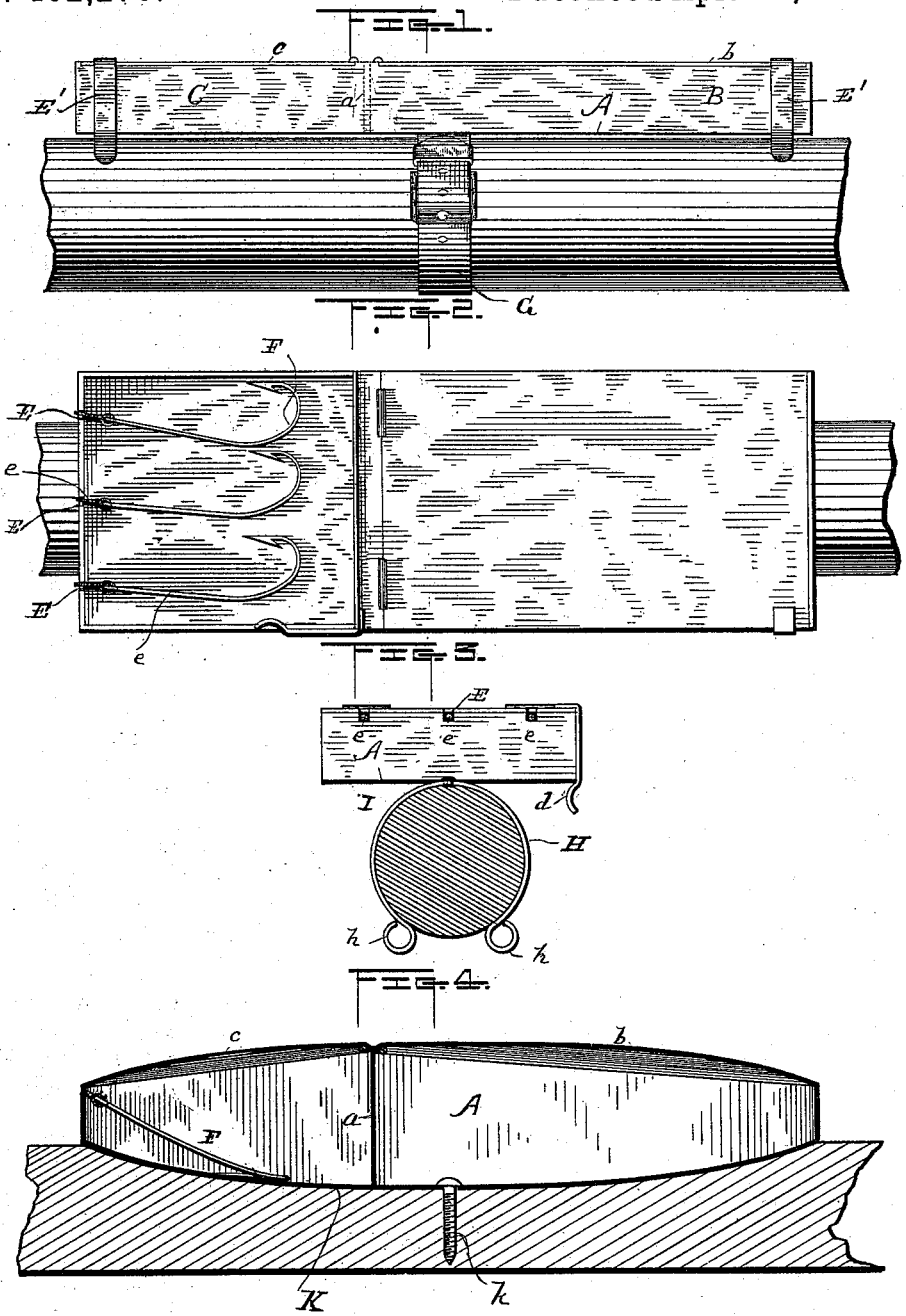

UNITED STATES PATENT OFFICE.

WILLIAM B. MUMFORD, OF KANSAS CITY, MISSOURI.

HOOK AND BAIT SAFETY-BOX.

SPECIFICATION forming part of Letters Patent No. 402,270, dated April 30, 1889.

Application filed August 6, 1888. Serial No. 282,055. (No model.)

*To all whom it may concern:*

Be it known that I, WILLIAM B. MUMFORD, a citizen of the United States, residing at Kansas City, in the county of Jackson and State of Missouri, have invented certain new and useful Improvements in Combined Hook and Bait Safety-Boxes; and I do hereby declare the following to be a full, clear, and exact description of the invention, such as will enable others skilled in the art to which it appertains to make and use the same.

My invention relates to an improvement in a combined hook and bait safety-box.

The object is to provide a box which may be readily attached to a fisherman's rod or reel, and which shall be adapted to keep the hook or hooks, either with or without the bait thereon, from snarling or catching into the brush through which the fisherman may be walking, or into the fisherman's clothes, and which shall further be adapted to contain a supply of hooks or bait in a position to be conveniently reached and placed upon the hook.

With these ends in view my invention consists in certain features of construction and combinations of parts, as will be hereinafter described, and pointed out in the claims.

In the accompanying drawings, Figure 1 represents one form of the safety-box attached to the pole by means of a strap. Fig. 2 represents a plan view of the box with the cover to the hook-apartment open. Fig. 3 is an end view of the box, showing a spring-clamp for fastening the box to the pole; and Fig. 4 is a sectional view taken longitudinally through the box and pole, and showing the box of a modified form secured to the pole by a screw.

The box, as shown in Figs. 1, 2, and 3, is of a shallow elongated form, preferably rectangular in cross-section, and consists of a box portion, A, having bottom, sides, and ends, as is common, a cross-partition, a, dividing the box proper into two compartments, B and C, which are adapted to be covered by two separate covers, b and c, respectively. The covers b and c are hinged to the box A at the partition a, so that when the covers are both open they would swing up toward each other, back to back. Each cover is provided with a spring-catch, E', preferably consisting of a flat piece of spring metal secured firmly to the side edge of the cover, near its free end, and having a slight inward bend, d, adapted to take under the bottom of the box when the cover is forced home. This form of catch also serves as a convenient hold for the end of the finger, by which it may be sprung outward when it is desired to open the cover.

The outer end of the compartment C—preferably the upper end of the box—is provided with a series of recesses, E, in its upper edge for the purpose of receiving the hook-shank, or line e, attached to the hook-shank, in order to admit of the cover c being shut down onto the box level with the upper edge of the end, with the hook F in position within the compartment C.

The object of the several recesses is to accommodate one or more spare hooks already baited, if so desired, and ready to be attached to the line in use without any unnecessary delay; or where several hooks are being employed on a single leader or line, as in trout-fishing with flies, each can be placed in the compartment C and kept distinct from its neighbor by leading its snell or line through one of the said recesses. The compartment B is of such size and shape as to conveniently accommodate the bait ordinarily used in stream and lake fishing.

To secure the box to the pole, I employ either a strap, G, as shown in Fig. 1, a broad portion of the strap being riveted or otherwise secured to the bottom of the box, or, as may be found preferable, I employ a pair of spring-jaws formed by bending a band of spring metal, H, into circular or oval shape, the ends of the jaws h being rounded, as shown, and adapted to rest normally in close proximity to each other. The band H is secured to the back of the box by a rivet, I, or by other suitable fastening. As shown in Fig. 4, the box is of an oval form, and one of its sides is let into a recess, K, of similar form, in the side of the pole, and the box itself is secured in position therein by means of a screw or rivet, k, or by other well-known and suitable fastener.

As thus constructed the box is always at hand for the attachment of a new hook or for the protection of the hooks in use while passing from place to place along the stream or lake.

Having thus fully described my invention, what I claim as new, and desire to secure by Letters Patent, is—

1. The combination, with a fishing-rod, of a combined bait and hook box having attached thereto a fastening device for securing the box to the pole, the said box being provided with a bait-compartment and a hook-compartment, and covers opening into said compartments, substantially as set forth.

2. The combination, with a fishing-rod and a combined bait and hook box, of a pair of spring-jaws secured to the box and adapted to be sprung around the pole to secure the box thereto, substantially as set forth.

3. A bait and hook box consisting of a receptacle having apertures in one of its ends and provided with a partition, and covers hinged to said receptacle and provided with catches for holding the covers in a closed position, in combination with a fastening device for securing the box to a fishing-rod, substantially as set forth.

In testimony whereof I have affixed my signature in presence of two witnesses.

WILLIAM B. MUMFORD.

Witnesses:
BESSIE E. YOUNG,
EVA WATSON.